United States Patent
Ghiotti et al.

(10) Patent No.: US 12,286,258 B2
(45) Date of Patent: Apr. 29, 2025

(54) PACKER MACHINE FOR THE PRODUCTION OF POUCHES EACH CONTAINING A PORTION OF A LOOSE PRODUCT

(71) Applicant: SASIB S.P.A., Castel Maggiore (IT)

(72) Inventors: Roberto Ghiotti, Castel Maggiore (IT); Sandro Baletti, Castel Maggiore (IT)

(73) Assignee: SASIB S.P.A., Castel Maggiore (IT)

( * ) Notice: Subject to any disclaimer, the term of this patent is extended or adjusted under 35 U.S.C. 154(b) by 0 days.

(21) Appl. No.: 18/221,165

(22) Filed: Jul. 12, 2023

(65) Prior Publication Data
US 2024/0017862 A1 Jan. 18, 2024

(30) Foreign Application Priority Data
Jul. 12, 2022 (IT) .................. 102022000014587

(51) Int. Cl.
*B65B 9/08* (2012.01)
*B65B 51/16* (2006.01)
*B65B 51/30* (2006.01)
*B65B 51/32* (2006.01)

(52) U.S. Cl.
CPC ............. *B65B 9/08* (2013.01); *B65B 51/16* (2013.01); *B65B 51/30* (2013.01); *B65B 51/32* (2013.01)

(58) Field of Classification Search
CPC ........... B65B 9/08; B65B 51/16; B65B 51/30; B65B 51/32; B65B 29/00; B65B 51/26; B65B 11/48; B65B 9/20; B65B 9/22; B65B 11/12; B65B 51/306; B65B 29/02; B29C 65/08; B29C 66/1122; B29C 66/4322
See application file for complete search history.

(56) References Cited

U.S. PATENT DOCUMENTS

2019/0329949 A1* 10/2019 St. Lawrence ............ B65B 1/22

FOREIGN PATENT DOCUMENTS

WO WO-20080114128 A2 9/2008

OTHER PUBLICATIONS

Italian Search Report and Written Opinion Corresponding to Italian Patent Application No. 102022000014587 dated Mar. 20, 2023.

* cited by examiner

*Primary Examiner* — Eronica Martin
(74) *Attorney, Agent, or Firm* — MARSHALL, GERSTEIN & BORUN LLP

(57) ABSTRACT

A packer machine for producing of pouches containing loose product, includes a conveyor device to move a band of wrapping material along a packing path; a wrapping station arranged along the path at which the band of wrapping material is wrapped to form a tubular wrap; a longitudinal sealing unit to seal the wrap in an overlapping section of the band; a feeding device with a feeding duct around which the band is bent to form the tubular wrap and which can feed the loose product into the wrap; a transverse sealing unit downstream of the longitudinal sealing unit configured to seal each tubular wrap to form an alternating succession of sealing sections and sections with loose product; and upper and lower sucking device arranged between the longitudinal sealing unit and the transverse sealing unit above and below the path, respectively, with upper and lower suction openings facing the path.

11 Claims, 10 Drawing Sheets

PACKER MACHINE FOR THE PRODUCTION OF POUCHES EACH CONTAINING A PORTION OF A LOOSE PRODUCT

CROSS-REFERENCE TO RELATED APPLICATIONS

This patent application claims priority from Italian patent application no. 102022000014587 filed on Jul. 12, 2022, the entire disclosure of which is incorporated herein by reference.

TECHNICAL FIELD

The present invention relates to a packer machine for the production of pouches containing portions of a loose product.

The present invention finds advantageous application to the production of snus pouches (namely, permeable pouches each containing a prepacked portion of a loose and moist nicotine-based product for oral use), to which the following disclosure will make explicit reference without thereby loosing generality.

PRIOR ART

As known, snus pouches have a rectangular shape and have a longitudinal seal and a pair of transverse seals.

A known packer machine (for example as described in patent application WO2008114128A2) for the production of snus pouches comprises: a conveyor device for conveying a band of wrapping material along a packing path; a wrapping station arranged along the packing path and where the band of wrapping material is wrapped so as to form a tubular wrap having a longitudinal development; a longitudinal sealing unit to longitudinally seal the tubular wrap in the area of an overlapping section of the band of wrapping material; a feeding device for the loose material to feed, one after the other, the portions of loose product into the tubular wrap; a transverse sealing unit to transversally seal the tubular wrap so as to form an alternating succession of sealing sections and sections containing a portion of loose product; and a cutting unit to transversely cut the tubular wrap in the area of the sealing sections in order to separate the single snus pouches.

In particular, the feeding device ends with a feeding duct (having a circular cross-section) around which the wrapping material is bent so as to form the tubular wrap and which feeds the portions of loose product into the tubular wrap.

The longitudinal sealing unit comprises a heated sealing head (for example a rotating roller) which is movably mounted to be pushed with a calibrated elastic force against a striker element (generally made with a material having a low friction coefficient), which is mounted on the feeding duct and has a flat surface facing the sealing head. In other words, to carry out the longitudinal sealing, the sealing head, and the striker element "pinch," together the overlapping portions of the tubular wrap to simultaneously apply both heat (generated by the sealing head) and mechanical compression.

In the case of a double-line packer machine, all the operating components are "doubled" to simultaneously create two twin and side by side tubular wraps; in this embodiment, the longitudinal sealing unit comprises two heated sealing heads which are arranged next to one another and are mounted on the same movable assembly which is pushed with a calibrated elastic force generated by a single common actuator device.

The compressed air which is used to feed the portions of loose product into the tubular wrap is vented (namely, it is let out from inside the tubular wrap) between the longitudinal sealing unit and the transverse sealing unit so as to prevent the tubular wrap from inflating like a "balloon." The compressed air that comes out of the tubular wrap inevitably carries therewith some loose powdered material which must be collected and removed to prevent the same from dirtying the whole packer machine and above all from dirtying both the transverse sealing unit directly and the external surface of the tubular wrap in which the transversal sealing is to be carried out; in fact, in the presence of an excessive quantity of loose powdered product, the cross-sealing could not be carried out correctly. For this purpose, a suction device is arranged between the longitudinal sealing unit and the transverse sealing unit, configured for suctioning as much as possible all the loose powdered material that comes out of the tubular wrap.

Patent application US2019329949A1 describes a vertical machine of the FFS ("Form, Fill & Seal") type for the production of an oral pouch which, in use, is inserted into the mouth of a user.

DESCRIPTION OF THE INVENTION

The object of the present invention is to provide a packer machine for the production of pouches, each containing a portion of a loose product that allows to reach high productivity while guaranteeing high quality standards and, in particular, allows to effectively collect and remove the loose powdered material that comes out from the tubular wrap upstream of the transverse sealing unit.

According to the present invention, a packer machine is provided for the production of pouches, each containing a portion of a loose product, according to what is claimed in the attached claims.

The claims describe preferred embodiments of the present invention forming an integral part of the present description.

BRIEF DESCRIPTION OF THE DRAWINGS

The present invention will now be described with reference to the attached drawings, which illustrate some non-limiting embodiments thereof, wherein.

PREFERRED EMBODIMENTS OF THE INVENTION

Figure 1:
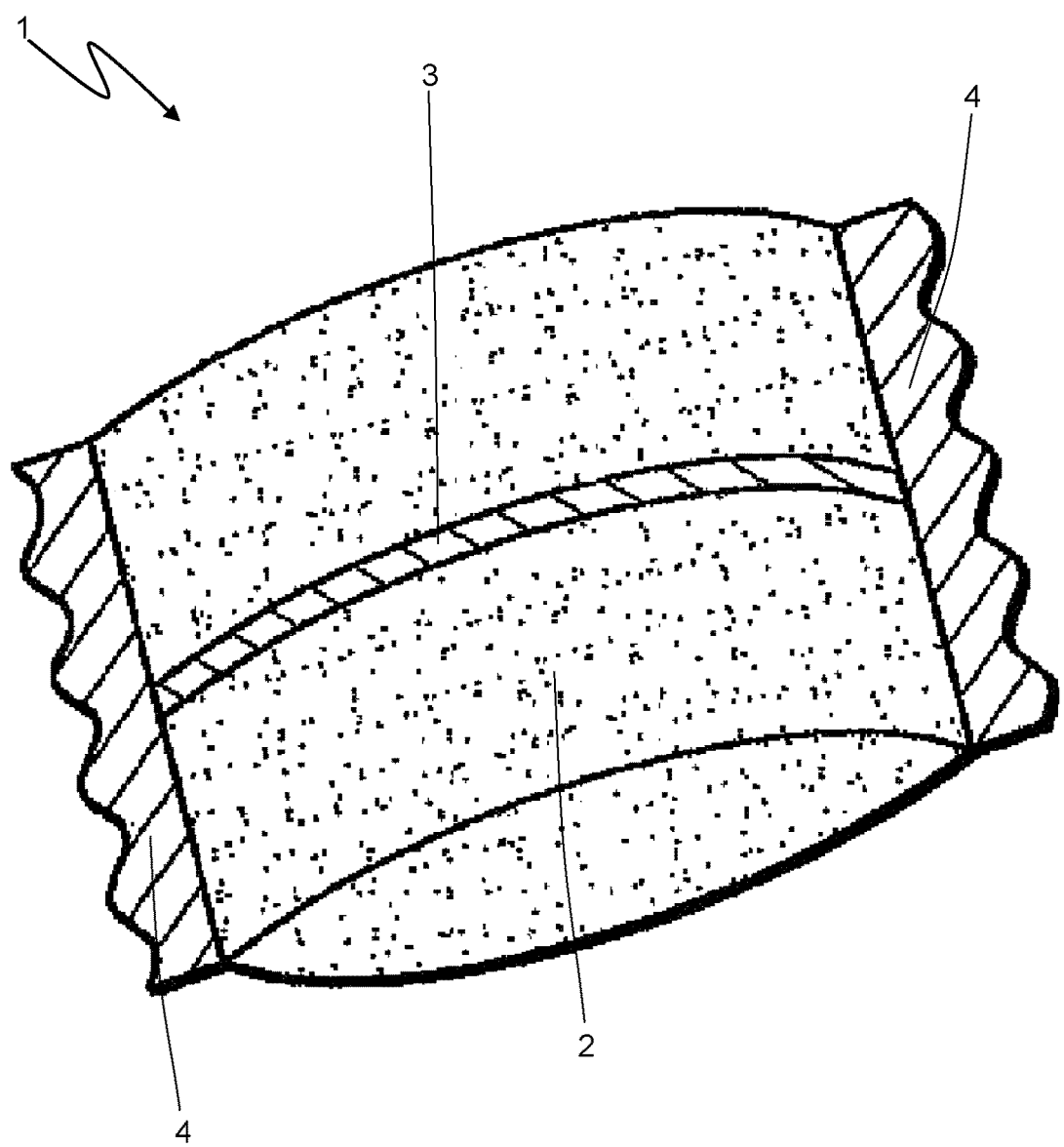
FIG. 1 is a perspective view of a snus pouch.

Number 1 in FIG. 1 denotes, as a whole, a snus pouch that contains inside a portion 2 of snus (namely, of a loose and moist nicotine-based product for oral use). The pouch 1 is closed by a longitudinal seal 3 and by two transverse seals 4.

Figure 2:
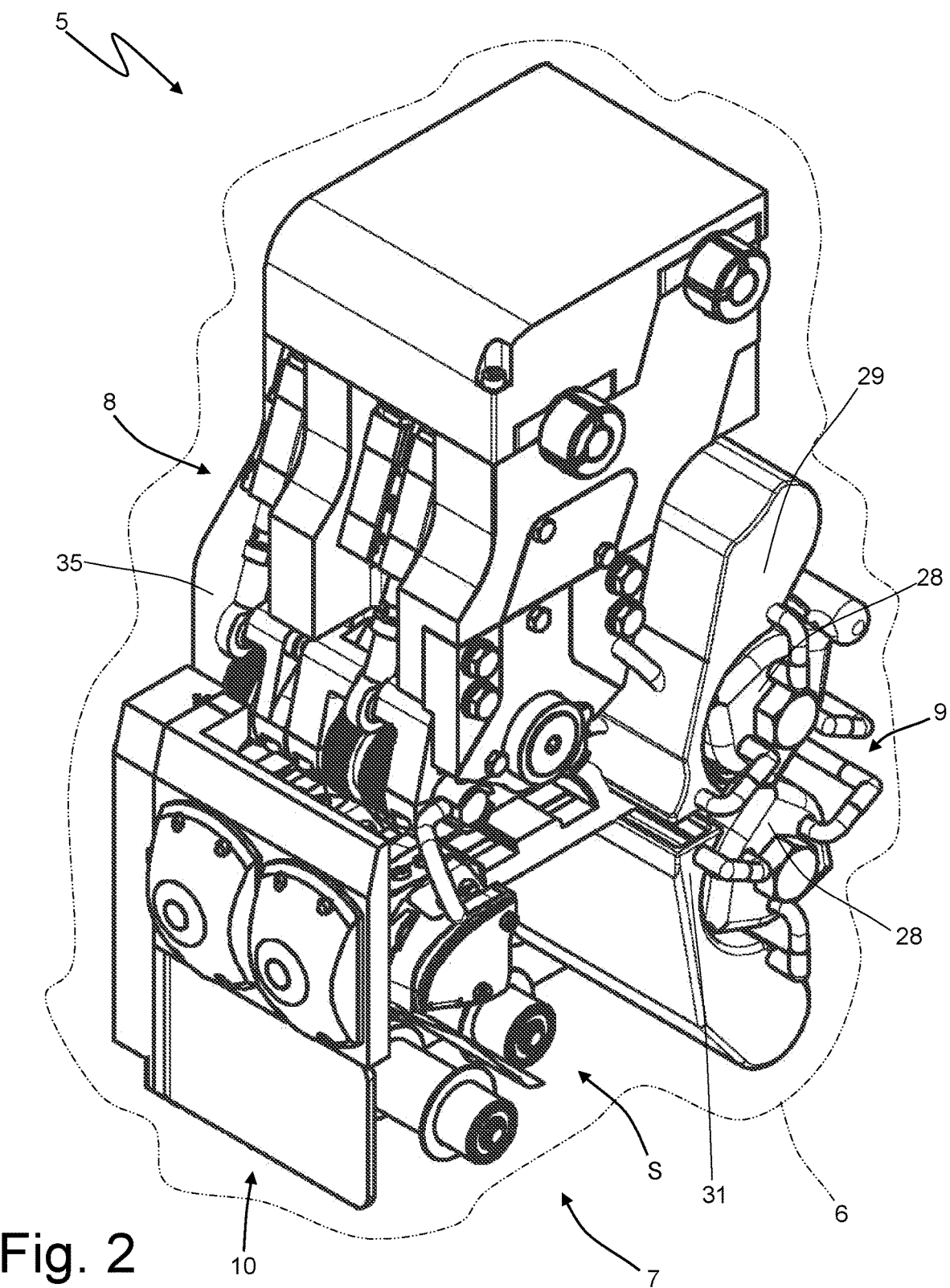
FIGS. 2 and 3 are a perspective view and a front view of part of a packer machine, respectively, which produces snus pouches of the type illustrated in FIG. 1.
Figure 3:
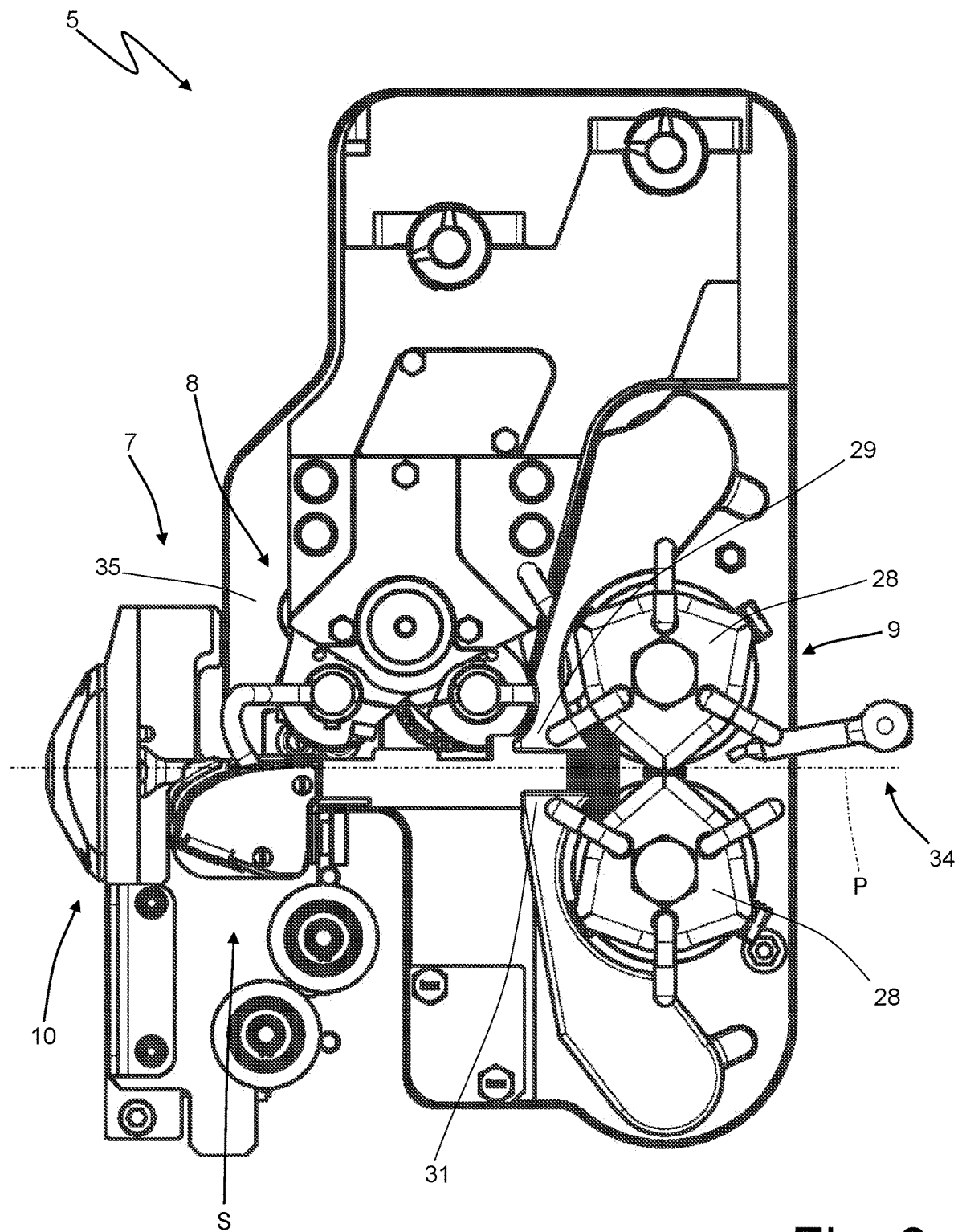
Figure 4:
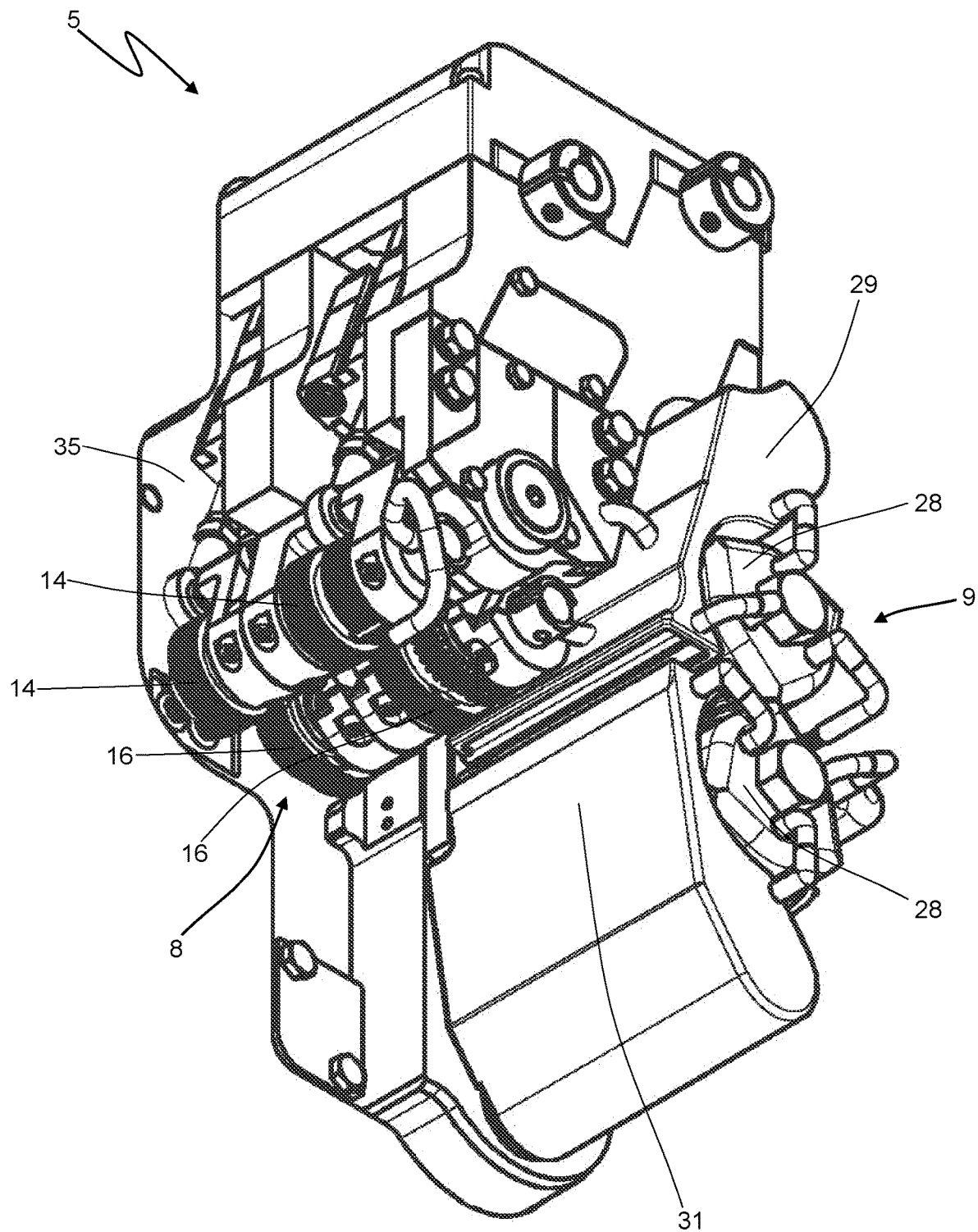
FIG. 4 is a perspective view of a longitudinal sealing unit and of a transverse sealing unit of the packer machine of FIGS. 2 and 3 with some parts removed for clarity.

Number 5 in FIGS. 2 and 3 denotes, as a whole, a packer machine that produces the snus pouches 1.

The packer machine 5 is of the FFS ("Form, Fill and Seal") type, operates on a double line to make two snus pouches 1 at a time, and comprises a frame 6 (schematically and partially illustrated in FIG. 2), which rests on a floor and has a vertical support wall on which all the operating components that contribute to the production of the snus pouches 1 are mounted.

The packer machine 5 comprises a conveyor device 7 (partially illustrated in FIGS. 2 and 3) for conveying a band of wrapping material along a straight packing path P (schematically illustrated in FIG. 3). Along the packing path P a wrapping station S is arranged, where the band of wrapping material is wrapped to form a tubular wrap having a longitudinal development. Along the packing path P and downstream of the wrapping station S, a longitudinal sealing unit 8 is arranged to longitudinally seal the tubular wrap in the area of an overlapping section of the band of wrapping material so as to form the longitudinal seal 3. Along the packing path P and downstream of the longitudinal sealing unit 8, a transverse sealing unit 9 is arranged to transversely seal the tubular wrap so as to form an alternating succession of sealing sections (in the area of the transverse seals 4) and sections containing a portion of loose product 2. At the wrapping station S a feeding device 10 for the loose material is provided to feed, one after the other, the portions of loose product into the tubular wrap. Finally, along the packing path P and downstream of the transverse sealing unit 9, a cutting unit (not illustrated) is arranged to transversely cut the tubular wrap in the area of the sealing sections (namely, the transverse seals 4) so as to separate the single snus pouches 1.

In the embodiment illustrated in the attached figures, the packer machine 5 operates on a double line, namely, it wraps two tubular wraps at the same time in order to make two snus pouches 1 at a time along two parallel and side by side packing paths P; namely, in a double-line packer machine 5, all the operating components are "doubled" to simultaneously produce two twin and side by side tubular wraps. According to a different embodiment not illustrated, the packer machine 5 operates on a single line, namely, it wraps a single tubular wrap to obtain one snus pouch 1 at a time.

Figure 7:
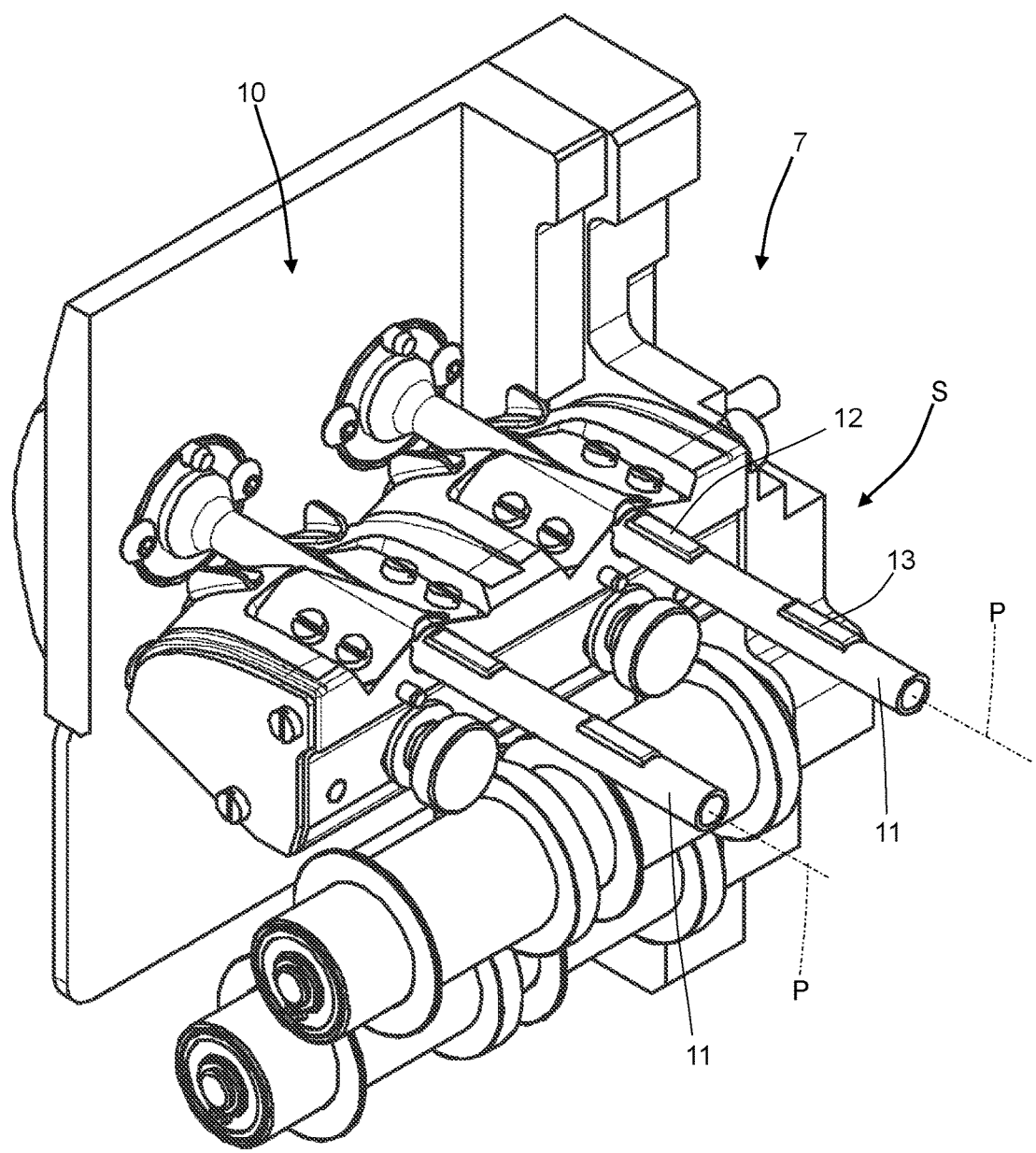
FIG. 7 is a perspective view of a feeding device of the packer machine of FIGS. 2 and 3 with some parts removed for clarity.

As illustrated in FIG. 7, the feeding device 10, in each production line (namely, in each packing path P), ends with a feeding duct 11 around which the wrapping material is bent so as to form the tubular wrap; each feeding duct 11 is configured to "shoot" (namely, insert) the portions 2 of loose product into the tubular wrap by means of compressed air. In the embodiment illustrated in FIG. 7, each feeding duct 11 has a circular cross-section.

As illustrated in FIG. 7, the longitudinal sealing unit 8 comprises along each feeding duct 11 a striker element 12 arranged upstream and a striker element 13 arranged downstream at a given distance from the striker element 12; namely, along each feeding duct 11 two striker elements 12 and 13 are arranged in series, one after the other. In other words, the longitudinal sealing unit 8 comprises two striker elements 12 mounted next to one another on the two feeding ducts 11 and two striker elements 13 mounted next to one another on the two feeding ducts 11. Generally, the striker elements 12 and 13 are made of a material having a low friction coefficient (such as, for example, polytetrafluoroethylene).

The longitudinal sealing unit 8 comprises two sealing elements 14, each configured to carry out a longitudinal sealing of the corresponding tubular wrap.

According to the preferred embodiment, each sealing element 14 is a sealing roller 14.

Figure 5:
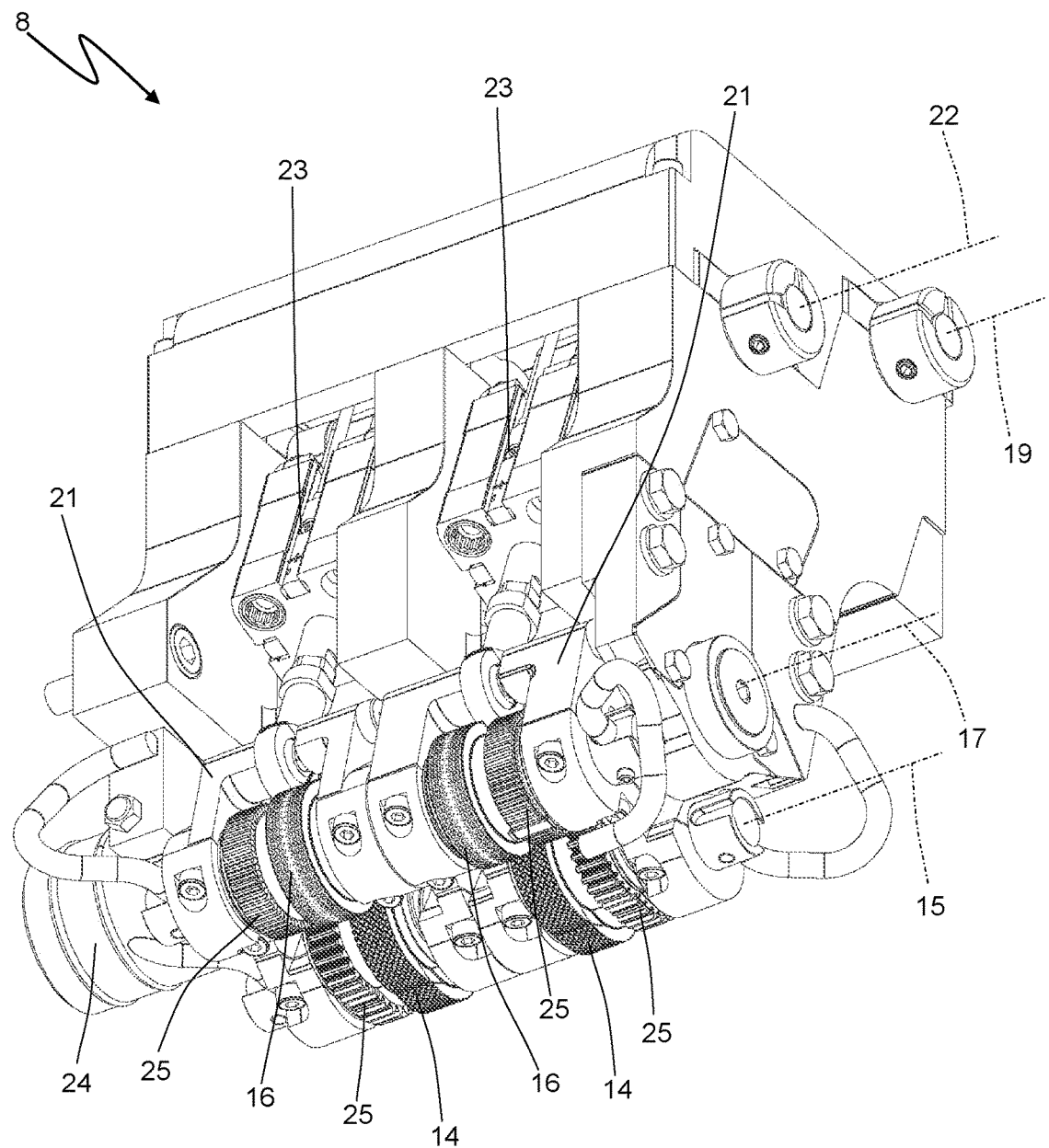
FIGS. 5 and 6 are two different perspective views of the longitudinal sealing unit of FIG. 4.
Figure 6:
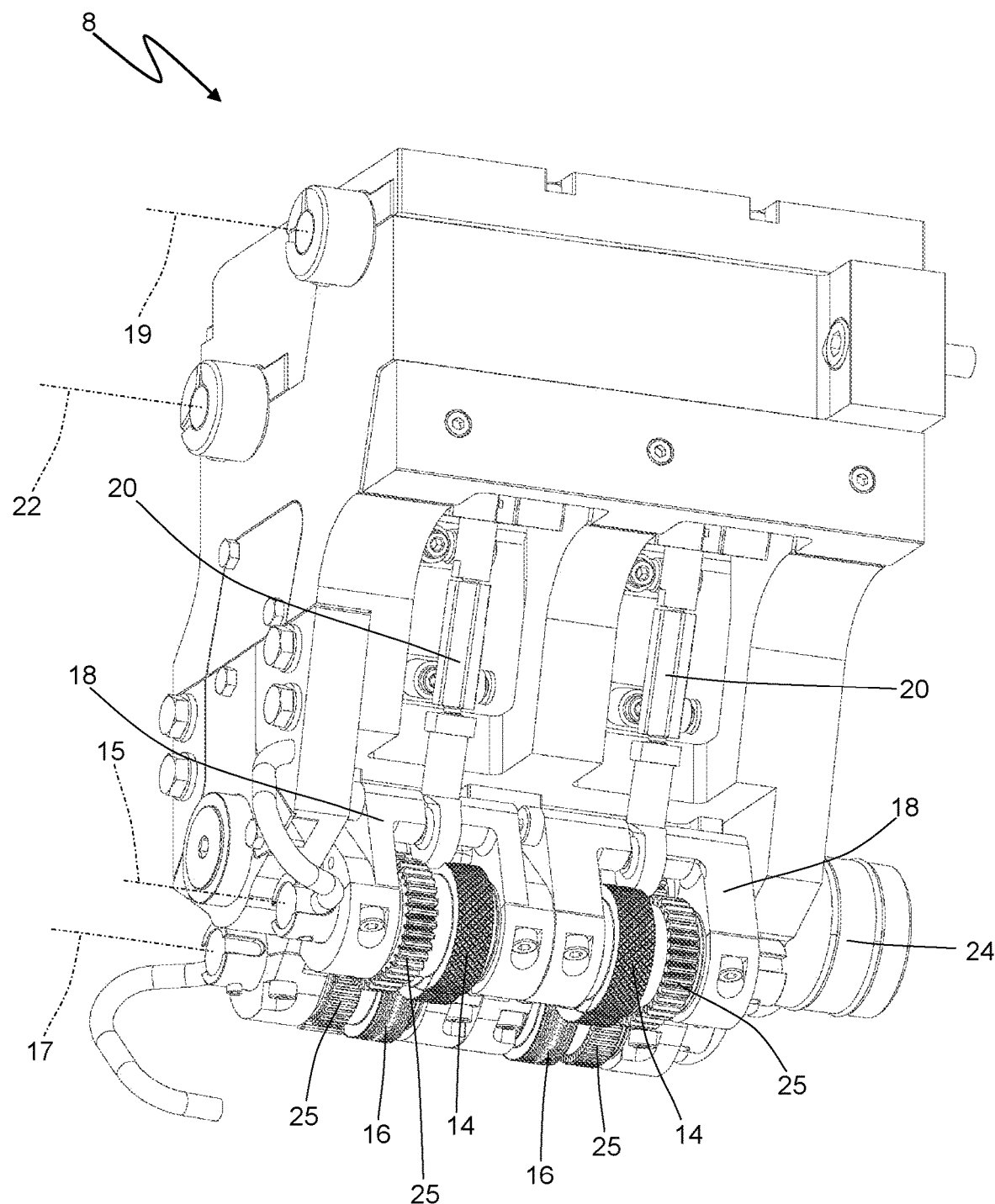

As illustrated in FIGS. 5 and 6, the longitudinal sealing unit 8 comprises two sealing rollers 14 (coaxial with one another), each of which is mounted so as to rotate around a horizontal rotation axis 15, is heated by means of electrical resistance heaters, and is configured to carry out a longitudinal sealing cooperating with a corresponding striker element 12.

Furthermore, the longitudinal sealing unit 8 comprises two sealing elements 16 each configured to carry out a longitudinal sealing of the corresponding tubular wrap.

According to the preferred embodiment, each sealing element 16 is a sealing roller 16.

In particular, the longitudinal sealing unit 8 comprises two sealing rollers 16 (coaxial one with the other), each of which is arranged downstream of a corresponding sealing roller 14, is mounted so as to rotate around a rotation axis 17 parallel to the rotation axis 15, is heated by means of electrical resistance heaters, and is configured to carry out the longitudinal sealing cooperating with a corresponding striker element 13. In other words, the longitudinal sealing unit 8 comprises four sealing rollers 14 and 16: two sealing rollers 14 that are coaxial one with the other and therefore arranged side by side along the packing path P and two sealing rollers 16, which are coaxial one with the other and therefore arranged side by side along the packing path P. Basically, the sealing rollers 14 and 16 form the heated sealing heads whereas the striker elements 12 and 13 form the anvils against which the sealing heads press in order to apply the pressure necessary to carry out the heat sealing.

According to a preferred embodiment, the sealing rollers 14 have a side surface with a raised texture whereas the sealing rollers 16 have a smooth side surface: sealing rollers 14 having side surface with a raised texture also apply a longitudinal thrust to the tubular wrap to contribute to the movement of the tubular wrap whereas the sealing rollers 16 having smooth side surface only carry out the longitudinal seal 3 without applying a longitudinal thrust to the tubular wrap. It is preferable that only the sealing rollers 14 or only the sealing rollers 16 apply a longitudinal thrust to the tubular wrap, since if all the sealing rollers 14 and 16 apply a longitudinal thrust to the tubular wrap, between the sealing rollers 14 and the sealing rollers 16 the tubular wrap could be subjected to traction (in the event that the rotation speeds of the sealing rollers 14 and 16 were not exactly identical) which could damage the tubular wrap. According to other embodiments, all the sealing rollers 14 and 16 have a side surface with a raised texture or have a smooth side surface.

The longitudinal sealing unit 8 comprises two movable assemblies 18, each of which is mounted on the frame 6 so as to move along a pressing direction independently of the other movable assembly 18 and supports one single corresponding sealing roller 14. In particular, each movable assembly 18 is hinged to the frame 6 so as to rotate around a rotation axis 19 parallel to the rotation axes 17. Furthermore, the longitudinal sealing unit 8 comprises two actuator devices 20, each of which applies an elastic force directed along the pressing direction to a corresponding second movable assembly 18 independently of the other actuator device 20.

Similarly, the longitudinal sealing unit 8 comprises two movable assemblies 21, each of which is mounted on the frame 6 so as to move along a pressing direction independently of the other movable assembly 21 and supports one single corresponding sealing roller 16. In particular, each movable assembly 21 is hinged to the frame 6 so as to rotate around a rotation axis 22 parallel to the rotation axes 17. Furthermore, the longitudinal sealing unit 8 comprises two actuator devices 23, each of which applies an elastic force directed along the pressing direction to a corresponding second movable assembly 21 independently of the other actuator device 23.

In other words, each sealing element (roller) 14 or 16 perform a movement which is completely independent of the movement of the other sealing elements (rollers) 14 and 16 and therefore, in use, is completely free to always apply the optimum sealing pressure given by the corresponding actuator device 20 or 23 without being influenced by the other sealing elements (rollers) 14 and 16.

According to a preferred embodiment, each actuator device 20 or 23 comprises a pneumatic spring provided with a pressure adjuster; in this way, in use, it is possible to precisely adjust the thrust that the actuator device 20 or 23 exerts on the corresponding sealing element (roller) 14 or 16 and therefore the pressure with which the corresponding sealing element (roller) 14 or 16 carries out the sealing. For example, a commercially available pressure adjuster allows the pressure inside the pneumatic springs to be varied with a resolution of the order of 0.05 bar, thus allowing a very fine adjustment of the thrust that the actuator device 20 or 23 exerts on the corresponding sealing element (roller) 14 or 16.

The longitudinal sealing unit 8 comprises an actuator device 24 (generally a rotary electric motor) which is configured to cause the rotation (at least) of the sealing rollers 14 around the respective rotation axes 15. According to a possible embodiment, the actuator device 24 is configured to cause the rotation around the respective rotation axes 15 only of the two sealing rollers 14, which hence are driving elements, whereas the sealing rollers 16 are hinged in an idle manner around the respective rotation axes 17 and are driven elements; namely, the sealing rollers 14 exert a forward thrust on the tubular wrap whereas the sealing rollers 16 receive a forward thrust from the tubular wrap. According to an alternative embodiment, the sealing rollers 14 are driven while the sealing rollers 16 are driving. According to a further embodiment, all the sealing rollers 14 and 16 are driven or all the sealing rollers 14 and 16 are driving.

FIGS. 5 and 6 illustrate the embodiment in which all the sealing rollers 14 and 16 are driving and in this embodiment, a corresponding toothed gear 25 is associated with each sealing roller 14 or 16, which is carried by the respective movable assembly 18 or 21 and is angularly integral with the respective sealing roller 14 or 16. The longitudinal sealing unit 8 comprises further toothed gears which are mounted on the same shaft caused to rotate by the actuator device 24 and each mesh with a corresponding toothed gear 25 so as to transmit the rotary motion to the respective sealing roller 14 or 16. Thanks to the fact of using a single actuator device 24 to rotate all the driving sealing rollers 14 and 16, all the driving sealing rollers 14 and 16 always rotate synchronously (namely, with the same rotation speed and with the same phase).

In other words, the longitudinal sealing unit 8 comprises heated sealing heads formed by the sealing elements (rollers) 14 and 16 that are movably mounted to be pushed with a calibrated elastic force (generated by the actuator devices 20 and 23) against the respective striker elements 12 and 13, which are mounted on the feeding ducts 11 and have a flat surface facing the sealing head. Therefore, in order to make the longitudinal seals 3, the heated sealing heads made up of the sealing elements (rollers) 14 and 16 and the striker elements 12 and 13 "pinch" together the overlapping portion of the tubular wrap to simultaneously apply both heat (generated by the heated sealing heads) and mechanical compression.

Figure 8:
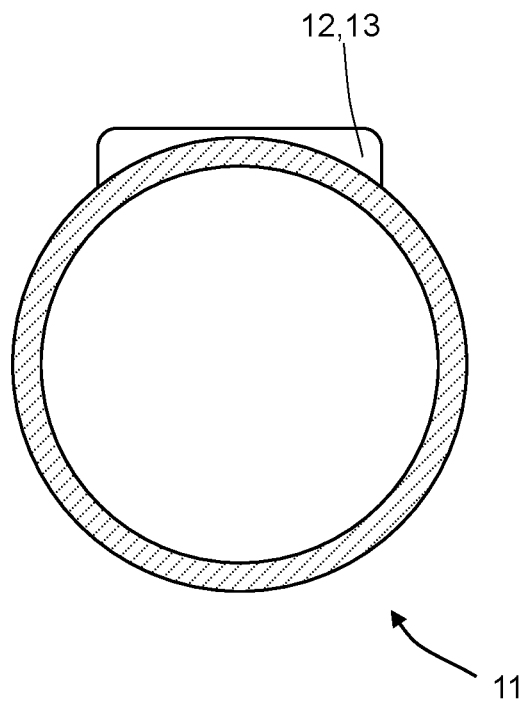
FIGS. 8 and 9 are two cross-sectional views of two embodiments of a feeding duct of the feeding device of FIG. 5.
Figure 9:
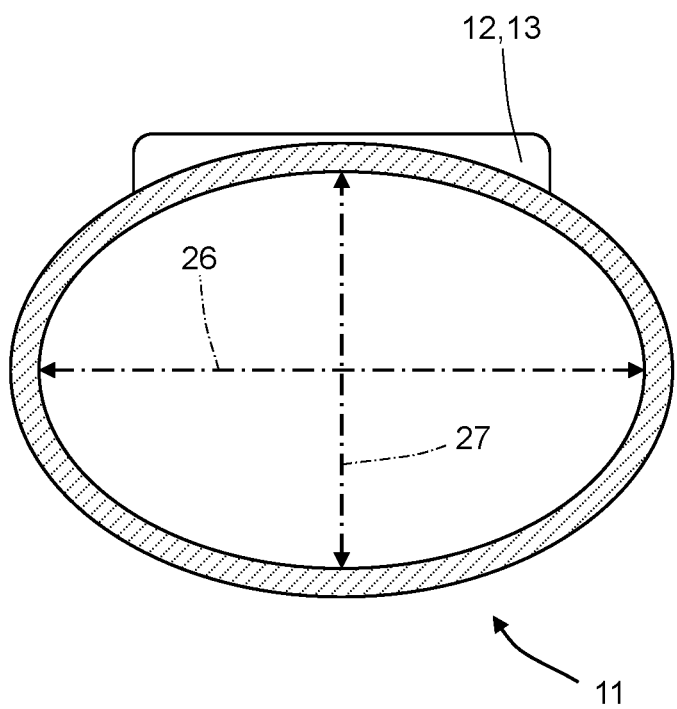

According to the embodiment illustrated in FIGS. 7 and 8, each feeding duct 11 has a circular cross-section; according to a different embodiment illustrated in FIG. 9, each feeding duct 11 has a cross-sectional shape with no circular symmetry and having a major axis 26 oriented (horizontally) parallel to a contact surface of the corresponding striker element 12 or 13 and a minor axis 27 oriented (vertically) perpendicularly to the contact surface of the corresponding striker element 12 or 13. In this way, each element 12 or 13 can be wider and therefore provide a larger contact area for making the longitudinal seal 3 thus allowing to carry out a more solid longitudinal seal 3. In this regard it is important to note that each element 12 or 13 cannot be wider than the respective feeding duct 11 to avoid having sharp edges which could lead to the tearing of the tubular wrap during its formation and its movement. Preferably, but not necessarily, each feeding duct 11 has an elliptical shape in cross section.

Figure 10:
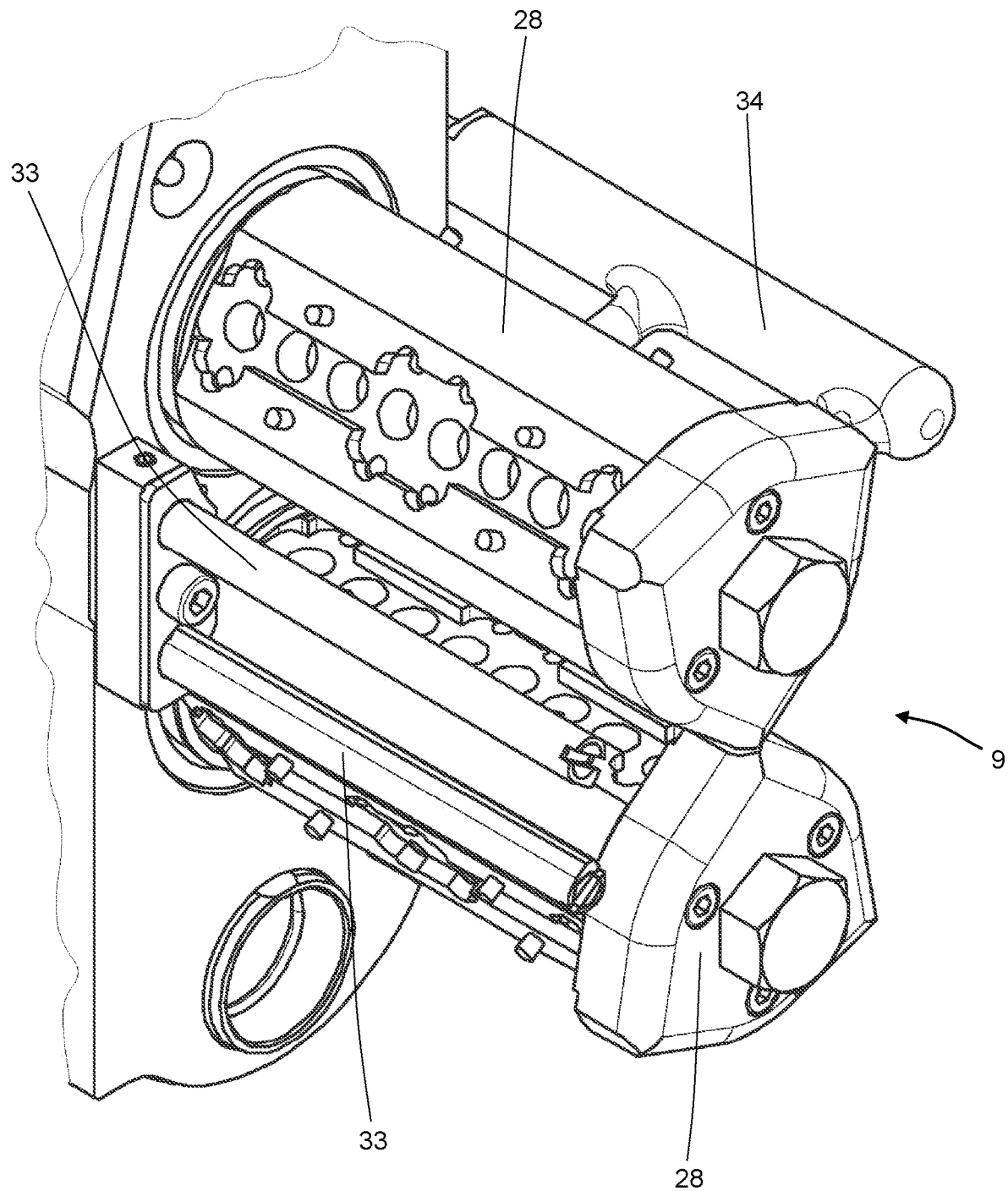
FIGS. 10 and 11 are a perspective view and a sectional view, respectively, of the transverse sealing unit of FIG. 4.
Figure 11:
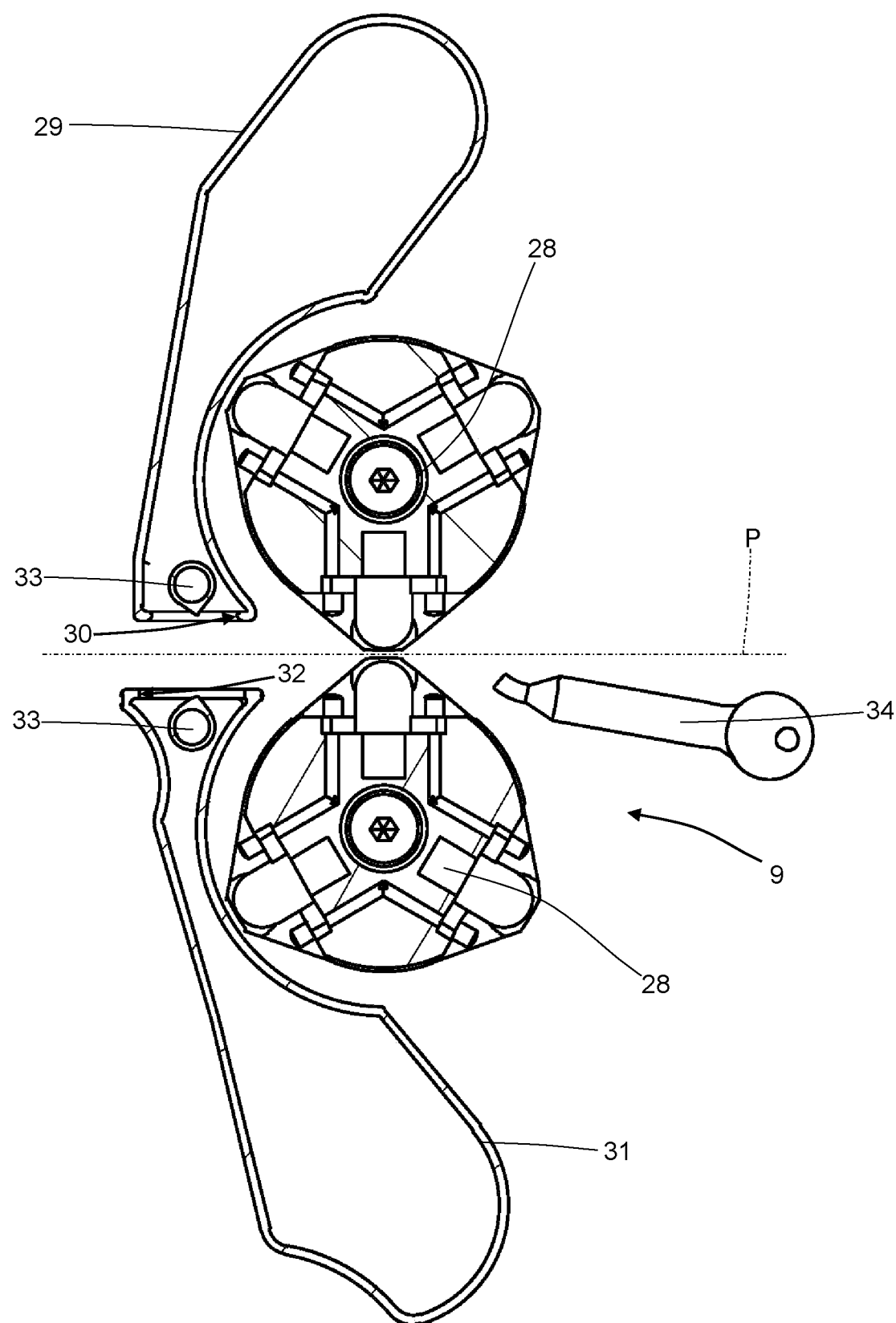

As better illustrated in FIGS. 10 and 11, the transverse sealing unit 9 comprises two opposite sealing rollers 28 that cooperate together to press one against the other (namely, together) the tubular wrap. The two sealing rollers 28 are mounted so as to rotate around two corresponding horizontal rotation axes (parallel to the rotation axes 15 and 17 of the sealing rollers 14 and 16) and are rotated by the same actuator device.

An upper sucking device 29 is provided (illustrated in FIG. 11), which is arranged between the longitudinal sealing unit 8 and the transverse sealing unit 9 above the tubular wraps (namely, above the packing path P) and has an upper suction opening 30 facing the tubular wraps (namely, the packing path P). Furthermore, a lower sucking device 31 is provided (illustrated in FIG. 11), which is arranged between the longitudinal sealing unit 8 and the transverse sealing unit 9 under the tubular wraps (namely, under the packing path P) and has a lower suction opening 32 facing the tubular wraps (namely, the packing path P). In other words, the two sucking devices 29 and 31 are opposite one another to enclose the tubular wraps (namely, the packing path P) and therefore the two suction openings 30 and 32 face and are aligned to one another.

According to a preferred embodiment, the distance between the two suction openings 30 and 32 is shorter than twice the thickness of the tubular wraps; in this way the two suction openings 30 and 32 define between one another a relatively small volume (in any case sufficient to allow easy passage of the tubular wraps) and therefore the suction action exerted by the two sucking devices 29 and 31 is more effective.

According to a preferred embodiment, the suction opening 30 or 32 of each sucking device 29 or 31 lies on a plane parallel to the packing path P. According to a preferred embodiment, the suction opening 30 or 32 of each sucking device 29 or 31 has a rectangular shape.

The compressed air which is used to feed ("shoot") the portions 2 of loose product into the tubular wraps through the feeding ducts 11 is vented (namely, it is let out from inside the tubular wrap) between the longitudinal sealing unit 8 and the transverse sealing unit 9 in order to prevent the same from inflating the tubular wraps like "balloons". The compressed air that comes out of the tubular wraps inevitably carries therewith loose powdered material (lost from the portions 2 of loose product) which must be removed to prevent the same from dirtying the whole packer machine 5 and above all from directly dirtying the transverse sealing unit 9, and the outer surface of the tubular wrap where the transversal sealing is to be carried out. In fact, in the presence of an excessive quantity of loose powdered product, the transverse seal 4 could not be carry outed correctly. For this purpose, the upper sucking device 29 (which is located above the tubular wrap, namely, above the packing path P) and the lower sucking device 31 (which is located under the tubular wrap, namely, under the packing path P) are arranged between the longitudinal sealing unit 8 and the transverse sealing unit 9, and are configured for suctioning, as much as possible, all the loose powdered material that comes out of the tubular wraps.

According to a preferred embodiment illustrated in FIGS. 10 and 11, two nozzles 33 are provided, each of which is arranged upstream of the transverse sealing unit 9 along the packing path P and is configured to emit a jet of compressed air directed towards the transverse sealing unit 9; in particular, the jets of compressed air emitted by the nozzles 33 are directed against a section sandwiched between the two sealing rollers 28 (namely, the area of the packing path P). Preferably, each nozzle 33 is arranged inside a respective sucking device 29 or 31 and is configured to emit the jet of compressed air through the suction opening 30 or 32 of the respective sucking device 29 or 31. According to a different embodiment not illustrated, only one of the two nozzles 33 is provided instead of both nozzles 33. The function of the nozzles 33 is to keep the transverse sealing unit 9 cleaner (particularly in the area comprised between the two sealing rollers 28) to prevent the "dispersed" loose powdered material from negatively interfering with the execution of the transverse seals 4.

According to a preferred embodiment illustrated in FIGS. 10 and 11, a cooling device 34 is provided, which is arranged downstream of the transverse sealing unit 9 along the packing path P and is configured to emit a jet of compressed air directed towards the tubular wraps (namely, towards the packing paths P). According to a preferred embodiment, the cooling device 34 comprises two parallel nozzles, each of which emits a jet of air directed towards a respective tubular wrap (namely, towards a respective packing path P). The cooling device 34 comprises a narrowing to cool the compressed air by means of the Venturi effect; namely, each nozzle of the cooling device 34 is fed through (at least) one duct in which a narrowing is made to cool the compressed air by means of the Venturi effect. In this way, the compressed air blown towards the tubular wraps after carrying out the transverse seals 4 is colder than the environment temperature and can cool the tubular wraps more effectively, stabilizing the just newly carried out seals 3 and 4 more quickly.

According to a possible embodiment illustrated in FIG. 2, the packer machine 5 comprises a support plate 35 which directly supports the movable assemblies 18 and 21 and is mounted on the frame 6 so as to slide perpendicularly to the packing path P and perpendicularly to the rotation axes 15 and 17 between a work position (illustrated in the attached figures) in which the sealing rollers 14 and 16 are arranged along the packing path P and a maintenance position (not illustrated) in which the two sealing rollers 14 are separated (raised upwards) from the packing path P (to allow quick and easy access to the feeding ducts 11 of the feeding device 10).

The embodiments described herein can be combined with one another without departing from the scope of the present invention.

The packer machine 5 described above has numerous advantages.

In the first place, the packer machine 5 described above allows to achieve high hourly productivity while ensuring a high-quality standard. This result is obtained, among other things, thanks to the fact that the packer machine 5 described above allows to obtain optimal longitudinal seals even in the case of a double production line; in particular, by making the movements of the sealing elements (rollers) 14 and 16 independent, each sealing element (roller) 14 and 16 always applies the optimum sealing pressure without being influenced by the other sealing elements (rollers) 14 and 16. An independent adjustment of the movements of the sealing elements (rollers) 14 and 16 is particularly important, since the sealing elements (rollers) 14 and 16 press against the striker elements 12 and 13 (acting as anvils) that are integral with the feeding ducts 11, which are mounted in a cantilevered manner and therefore are subject to variable, not entirely predictable, and significant flexures in use. This result is also obtained by using, on each production line, two successive sealing elements (rollers) 14 and 16, which carry out the longitudinal seal 3 in two consecutive steps. This result is also obtained by increasing the quality of the transverse seals 4 thanks to the fact that the loose powdered material that comes out from the tubular wraps upstream of the transverse sealing unit 9 is effectively collected and removed, preventing the same from interfering negatively with the carrying out of the transverse seals 4.

Furthermore, the packer machine 5 is particularly compact and allows an operator who is near the packer machine 5 to reach by hand all the various parts of the packer machine 5 without having to carry out unnatural movements.

Finally, the packer machine 5 is relatively simple and inexpensive to implement.

LIST OF REFERENCE NUMBERS OF THE FIGURES 1 snus pouch
2 portion
3 longitudinal seal
4 transverse seal
5 packer machine
6 frame
7 conveyor device
8 longitudinal sealing units
9 transverse sealing units
10 feeding device
11 feeding duct
12 striker elements
13 striker elements
14 sealing rollers
15 rotation axis
16 sealing rollers
17 rotation axis
18 movable assemblies
19 rotation axis
20 actuator devices
21 movable assemblies
22 rotation axis
23 actuator devices
24 actuator device
25 toothed gears
26 major axis 27 minor axis
28 sealing rollers
29 upper sucking device
30 upper suction opening
31 lower sucking device
32 lower suction opening
33 nozzle
34 cooling device
35 support plate
P packing path
S wrapping station

The invention claimed is:

1. A packer machine (5) for the production of pouches (1) containing portions (2) of a loose product; the packer machine (5) comprising:
   a conveyor device (7) configured to move at least one band of wrapping material along a packing path (P);
   a wrapping station (S) arranged along the packing path (P) and where the band of wrapping material is wrapped so as to form a tubular wrap having a longitudinal development;
   a longitudinal sealing unit (8) to longitudinally seal the tubular wrap in an area of an overlapping section area of the band of wrapping material;
   a feeding device (10) comprising a feeding duct (11), around which the band of wrapping material is bent so as to form the tubular wrap and which is configured to feed, one after the other, the portions (2) of loose product into the tubular wrap; and
   a transverse sealing unit (9), which is arranged downstream of the longitudinal sealing unit (8) and is configured to transversely seal each tubular wrap so as to form an alternating succession of sealing sections and sections containing one of the portions (2) of loose product;
   an upper sucking device (29), which is arranged between the longitudinal sealing unit (8) and the transverse sealing unit (9) above the packing path (P) and has an upper suction opening (30) facing the packing path (P); and
   a lower sucking device (31), which is arranged between the longitudinal sealing unit (8) and the transverse sealing unit (9) under the packing path (P) and has a lower suction opening (32) facing the packing path (P).

2. The packer machine (5) according to claim 1, wherein a distance between the upper suction opening (30) and the lower suction opening (32) is shorter than twice a thickness of the tubular wrap.

3. The packer machine (5) according to claim 1, wherein the upper suction opening (30) of the upper sucking device (29) and the lower suction opening (32) of the lower sucking device (31) each lies on a plane parallel to the packing path (P).

4. The packer machine (5) according to claim 1, wherein the upper suction opening (30) of the upper sucking device (29) and the lower suction opening (32) of the lower sucking device (31) each has a rectangular shape.

5. The packer machine (5) according to claim 1 and comprising at least one nozzle (33), which is configured to emit a jet of compressed air directed towards the packing path (P).

6. The packer machine (5) according to claim 5, wherein the nozzle (33) is arranged inside a sucking device (29, 31) and is configured to emit a jet of compressed air through the corresponding suction opening (30, 32).

7. The packer machine (5) according to claim 5, wherein:
   the transverse sealing unit (9) comprises two opposite sealing rollers (28); and
   the jet of compressed air emitted by the nozzle (33) is directed against a section comprised between the two sealing rollers (28) of the transverse sealing unit (9).

8. The packer machine (5) according to claim 1, wherein the longitudinal sealing unit (8) comprises a first striker element (12) mounted on the feeding duct (11) and a first sealing roller (14), which is mounted so as to rotate around a first rotation axis (15) and is configured to carry out a longitudinal sealing cooperating with the first striker element (12).

9. The packer machine (5) according to claim 8, wherein the longitudinal sealing unit (8) comprises:
   a second striker element (13) mounted downstream or upstream of the first striker element (12); and
   a second sealing roller (16), which is arranged downstream or upstream of the first sealing roller (14), is mounted so as to rotate around a second rotation axis (17) parallel to the first rotation axis (15) and is configured to carry out the longitudinal sealing cooperating with the second striker element (13).

10. The packer machine (5) according to claim 1 and comprising a cooling device (34), which is arranged downstream of the transverse sealing unit (9) and is configured to emit a jet of compressed air directed towards the tubular wrap.

11. The packer machine (5) according to claim 10, wherein the cooling device (34) comprises a narrowing to cool compressed air by means of the Venturi effect.

\* \* \* \* \*